United States Patent [19]
Burch et al.

[11] 3,824,685
[45] July 23, 1974

[54] METHOD OF MAKING A FERRITE HEAD

[75] Inventors: Nathan L. Burch, Los Angeles; Leonard G. Tapia, Baldwin Park, both of Calif.

[73] Assignee: Bell & Howell Company, Chicago, Ill.

[22] Filed: Feb. 14, 1972

[21] Appl. No.: 225,898

[52] U.S. Cl. .................................... 29/603, 264/61
[51] Int. Cl. ........................................... G11b 5/42
[58] Field of Search ................. 264/61, DIG. 58, 81; 29/603; 117/235, 239

[56] References Cited

UNITED STATES PATENTS

| | | | |
|---|---|---|---|
| 3,458,926 | 8/1969 | Maissel et al. | 29/603 |
| 3,557,266 | 1/1971 | Chiba et al. | 264/332 |
| 3,624,897 | 12/1971 | Reade et al. | 29/603 |
| 3,639,701 | 2/1972 | Secrist et al. | 29/603 |
| 3,672,045 | 6/1972 | Robertson | 29/603 |
| 3,706,132 | 12/1972 | Weaver | 29/603 |

*Primary Examiner*—Jan H. Silbaugh
*Attorney, Agent, or Firm*—David Weiss

[57] ABSTRACT

In a method of manufacturing a ferrite magnetic head, a thin layer of glass is sputtered onto one or more discrete portions of a planar surface of each of two ferrite members, at least one of the glass layers extending out of a gap defined when the two members are positioned with their respective planar surfaces in confronting relation. A layer of refractory material is deposited on other portions of the ferrite surfaces, to a thickness equal to the desired gap length, to serve as a spacer when the two members are so positioned. A quantity of glass is placed adjacent the gap and in contact with at least one of the sputtered glass layers, and the assembly is heated to soften the glass layers and the quantity of glass; the quantity of glass is drawn into the remaining portion of the gap apparently in response to a reduced resistance to capillary flow provided by the softened glass layers within the gap.

23 Claims, 5 Drawing Figures

METHOD OF MAKING A FERRITE HEAD

BACKGROUND OF THE INVENTION

1. Field of the Invention

This invention relates to ferrite heads for magnetic recording/playback apparatus, and more particularly to an improved method of making ferrite heads having extremely small gap lengths.

2. Description of the Prior Art

The high magnetic permeability and low electrical conductivity of ferrites have made this class of materials available for utilization as cores for magnetic transducer heads, particularly for recording high-frequency signals on magnetic tape. Such cores include a pair of poles separated at their tips by an accurately defined gap. During recording or playback, magnetic tape is transported over the "running surface" of the head in a direction parallel to the gap "length" (i.e., the distance between the pole tips) in magnetic contact with the poles.

The brittleness of polycrystalline ferrite materials, however, has been primarily responsible for the experienced useful life of such heads being less than wear expectation based upon the hardness of such materials, producing chipping and crystal breakout at the pole tips.

A conventionally practiced method of counteracting the effect of such brittleness is to mechanically support the ferrite material at the pole tips by filling the gap with a nonmagnetic, wear-resistant, structural material, such as glass. Since the extent of the support afforded by the glass gap-material is greatly influenced by the integrity of the ferrite-to-glass interface, it is generally agreed that the glass gap-material should be intimately bonded to the ferrite pole tips and that the useful life of the head is directly related to the success in forming the bond.

The prior art includes several methods of forming bonds between the ferrite and the glass, such as by inserting a glass-forming powder or glaze, or a glass plate, between flat confronting surfaces of two ferrite members and heating the assembly to melt the glass while the two members are moved toward one another until the desired gap length is attained.

In another method, taught by U.S. Pat. No. 3,246,383, the polished surfaces of the two ferrite members are separated by interposed shims having a thickness equal to the desired gap length, and a quantity of glass (such as a glass rod) is placed adjacent to the gap; when the assembly is heated to melt the glass rod, the liquified glass is drawn into and fills the gap by capillary action. Nevertheless, for extremely narrow gap lengths—such as less than 40 microinches—the high surface tension of the polished ferrite surfaces causes substantial resistance to capillary flow of the liquified glass. As the gap length is decreased still further—to less than about 20 microinches—capillary action becomes by itself ineffective to cause the liquified glass to fill the gap within a commercially reasonable time.

SUMMARY OF THE INVENTION

The present invention provides a method of manufacturing magnetic ferrite heads having gap lengths which can be reproducibly controlled to be narrower than the practical limit presently available by the prior art processes described above.

In accordance with a preferred manner of practicing the method of the present invention, a thin layer of glass is deposited on one or more discrete portions of a planar surface of each of two ferrite members—by radio frequency (RF) sputtering, a technique well-known to the insulator deposition art. See, for example, *Electronics* Sept. 20, 1965, page 145. See also, as to the sputtering technique as applied to ferrite head manufacture, U.S. Patent application Ser. No. 844,851, now U.S. Pat. No. 3,624,897 (assigned to the present assignee), and U.S. Pat. No. 3,458,926.

The glass layer is deposited to extend from the discrete planar surface onto an adjacent surface of at least one of the ferrite members, so that when the two members are positioned with their respective planar surfaces in confronting relation to define a gap therebetween, the glass layer extends out of the gap.

A layer of refractory material having a melting point higher than that of the glass is deposited on other portions of the planar surface of one of the ferrite members, by suitable deposition techniques; e.g., vacuum deposition or sputtering of silicon monoxide. The refractory layer is deposited to a thickness equal to the desired gap length.

The two ferrite members are thereupon positioned with the sputtered glass layers in confronting relation and with the refractory layer in contact engagement with the surface of the ferrite member upon which the refractory layer has not been applied. A quantity of glass is placed adjacent the gap but in contact with at least one of the sputtered glass layers, and the assembly is heated to soften the layers of glass and the quantity of glass while the refractory layer is maintained in its contact engagement with the unlayered (refractory) ferrite member.

The presence of the sputtered layers of glass, which are already within the gap before the assembly is heated and extending from the gap, is responsible for the success of the present method in the formation of glass-filled gaps having lengths less than 40 microinches, and glass-filled gaps having lengths of 20 microinches and less have been successfully formed. It is believed that the softened glass layers within and extending from the gap reduces resistance to capillary flow and initiates entry of the adjacent liquified glass into the partially filled gap. The adjacent glass is drawn into the remaining portion of the gap apparently in response to this reduced resistance to capillary flow.

BRIEF DESCRIPTION OF THE DRAWINGS

The novel features which are believed to be characteristic of the present invention will be better understood from the following description considered in connection with the accompanying drawings in which a preferred manner of practicing the method of the present invention is illustrated by way of example. It is to be expressly understood, however, that the drawings are for the purpose of illustration and description only and are not intended as a definition of the limits of the invention.

DETAILED DESCRIPTION OF THE PREFERRED MANNER OF PRACTICING THE INVENTION

Figure 1:
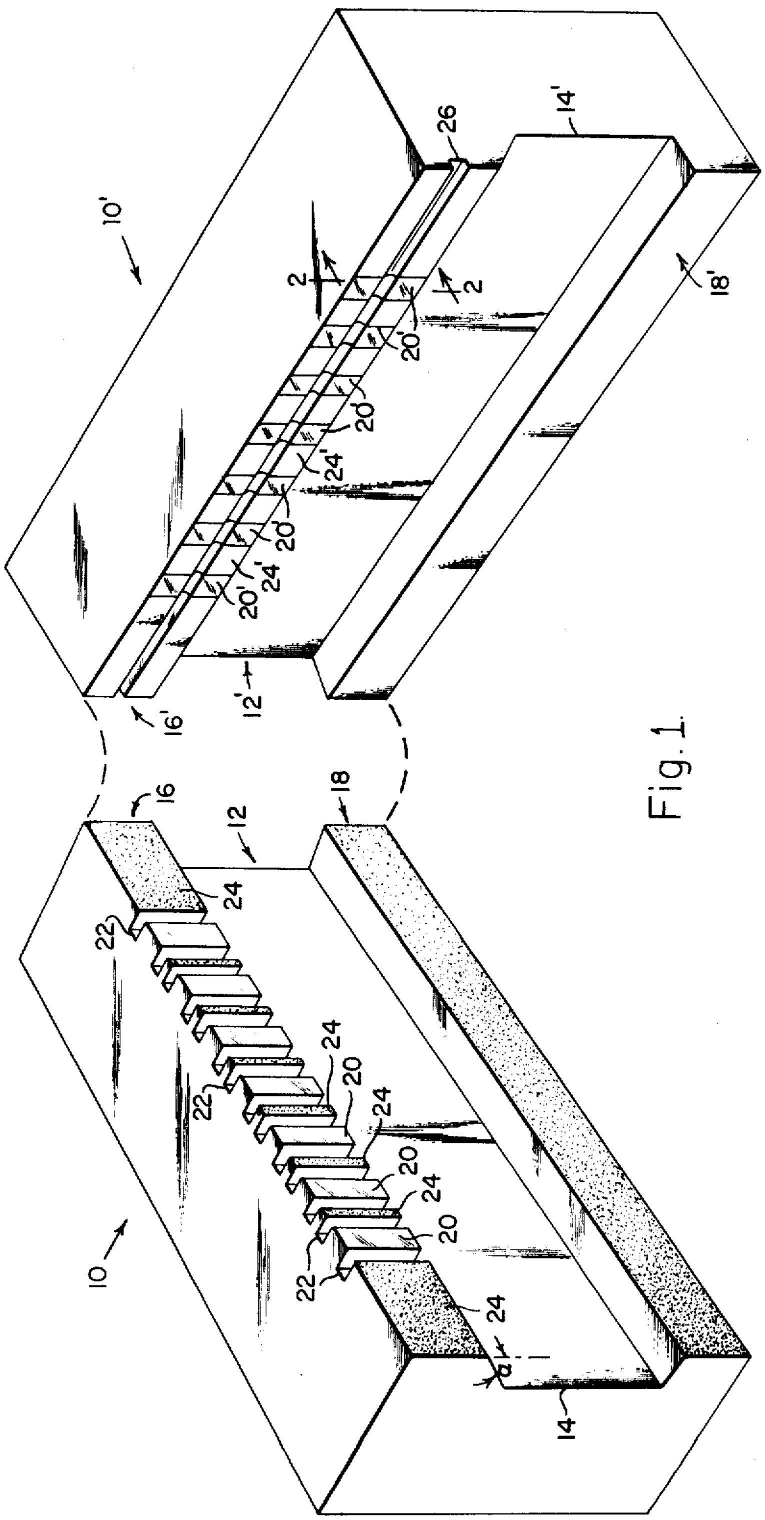
FIG. 1 is a perspective view of two ferrite members which have been prepared in accordance with a preferred manner of practicing the method of the present invention and which will result in the fabrication of a multitrack magnetic head.

Turning first to FIG. 1, a first magnetic ferrite member 10 is machined to have a face 12 profiled to include a channel portion 14 with respect to a rectangular upper surface 16 and a rectangular lower surface 18. The surfaces 16, 18 are coplanar and longitudinally parallel to each other, the intersection of the channel portion 14 with the upper surface 16 forming an acute angle $\alpha$. It should be realized, however, that if the method of the present invention were practiced for fabricating two multitrack heads, the intersection of the channel portion 14 with the lower surface 18 would similarly form an acute angle.

A plurality of first discrete surface portions 20 of the upper surface 16 are selected in spaced relation to one another, the position of each of these first surface portions coinciding with the desired pole tip locations. The surface portions 20 are rectangular in configuration and are longitudinally parallel to each other, their longitudinal dimensions being perpendicular to the longitudinal dimension of the upper surface 16. Preferably, parallel grooves 22 are cut in the upper surface 16, on both sides of each surface portion 20, for precisely defining the width of each of the surface portions. A series of second discrete surface portions 24 remain between the grooves 22 and on either side of the first and last grooves.

A second magnetic ferrite member 10' is machined to have a second face 12', profiled to include a second channel portion 14' with respect to a rectangular second upper surface 16' and a rectangular second lower surface 18', the second surfaces 16', 18' being coplanar and arranged for confronting relation with respect to the upper and lower surfaces 16, 18 of the first ferrite member 10. A longitudinal groove 26 is cut into the second upper surface 16', the groove 26 being spaced from the lower edge of the second upper surface 16' a distance greater than the desired depth of the gap.

The ferrite members 10, 10' are thereupon prepared for having deposited on the first surface portions 20 and on corresponding surface portions 20' (of the second upper surface 16', these surface portions 20' arranged for confronting relation with corresponding surface portions 20 of the first ferrite member 10), by RF sputtering, a layer of glass having a thickness which is small relative to the desired gap length. Such glass is thereupon sputtered onto the surface portions in accordance with RF sputtering methods well-known in the art, to a thickness appreciably less than half the desired gap length. For example, for a gap length of 30 microinches suitable thicknesses of the sputtered glass layer can be less than 10 microinches, and it is preferred that this thickness be as small as 2 microinches or less.

Figure 2:
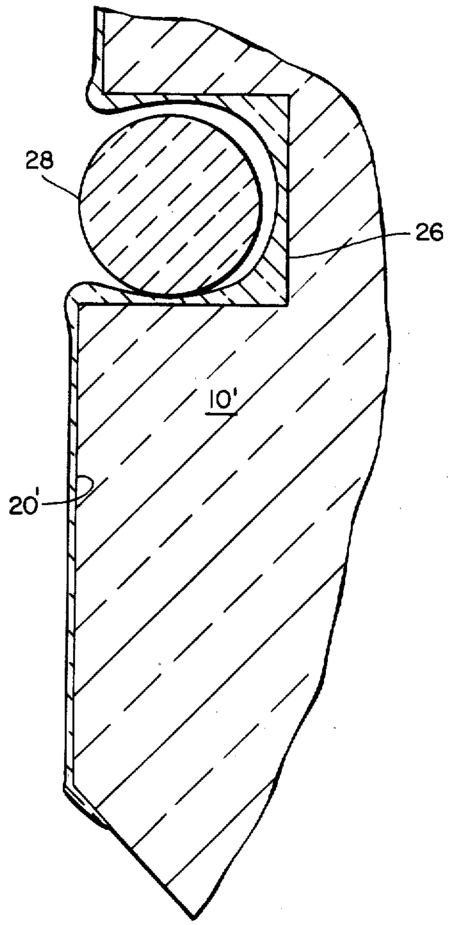
FIG. 2 is a fragmentary cross-sectional view of one of the ferrite members taken along the line 2—2 of FIG. 1 in the direction of the appended arrows, and includes a glass rod inserted within the groove shown in FIG. 1, the relative dimensions of the component parts of FIG. 3 shown exaggerated for the purpose of clarity of description.

During the sputtering of glass onto the surface portion 20' of the second upper surface 16', interior portions of the longitudinal groove 26 become coated with glass, substantially as shown (exaggeratedly) in FIG. 2. These interior coatings of the groove 26, extending from the glass layer coated on the surface portions 20', are established by glass striking the various ferrite surfaces from plural angles of incidence. The importance of this layer of glass within the slot 26 will be described later.

Returning to FIG. 1, after the glass layer has been sputtered onto the first surface portions 20 of the first ferrite member 10, the face 12 of the first ferrite member 10 is prepared to have a refractory material (having a melting temperature higher than the softening temperature of the sputtered glass) applied to the second surface portions 24 and to the lower surface 18. The refractory material is applied to a thickness equal to the desired gap length. For example, a layer of silicon monoxide can be deposited on the surface by well-known vacuum deposition techniques, or by sputtering techniques, the refractory layer being equal to the desired gap length. Obviously, the method of the present invention can be practiced with the glass sputtering and refractory material deposition steps in reverse order.

The lower surfaces 18, 18' can be prepared in a manner similar to the upper surfaces 16, 16', if it is desired to fabricate a second multitrack head from the two ferrite head members 10, 10'. Further, it should be realized that the number, spacing and widths of the various discrete surface portions can be varied, depending upon the number of tracks, the gap within and the spacing between tracks desired in each of the particular head units.

The two ferrite members 10, 10' are thereupon positioned with their faces 12, 12' in confronting relation; i.e., the various surface positions 20, 24 and the lower surface 18 of the first ferrite member 10 confronting the corresponding surface portions 20', 24' and the lower surface 18' of the second ferrite member 10'. The refractory layer serves as a spacer, and the glass-sputtered surface portions 20 are maintained spaced from their confronting glass-sputtered surface portions 20' by the thickness of the refractory layer; i.e., the desired gap length.

A quantity of glass, for example a glass rod 28, is placed within the longitudinal groove 26, in contact with the glass layer within the groove 26 as represented in FIG. 2. The entire assembly is thereupon heated to a temperature for causing the sputtered glass and the glass rod 28 to soften. The ferrite surfaces upon which the glass layer has been sputtered are wetted by the softened sputtered glass, and it is believed that this wetting is enhanced by the nature of the sputtering process—i.e., it is believed that the high impact of the glass striking the ferrite during sputtering causes an intimate bond between the glass and the ferrite.

The softened glass layer within the groove 26, being a continuation of the softened glass layer on the ferrite surface portions 20', initiates entry of the softened glass from the rod 28 into the partially filled gap, whereupon this softened glass from the rod 28 contacts the softened sputtered layers on both gap faces and is drawn into the remaining portion of the gap in response to the reduced resistance to capillary flow provided by the glass-wetted gap faces (i.e., the confronting glass coated surface portions 20, 20').

Figures 3, 5:
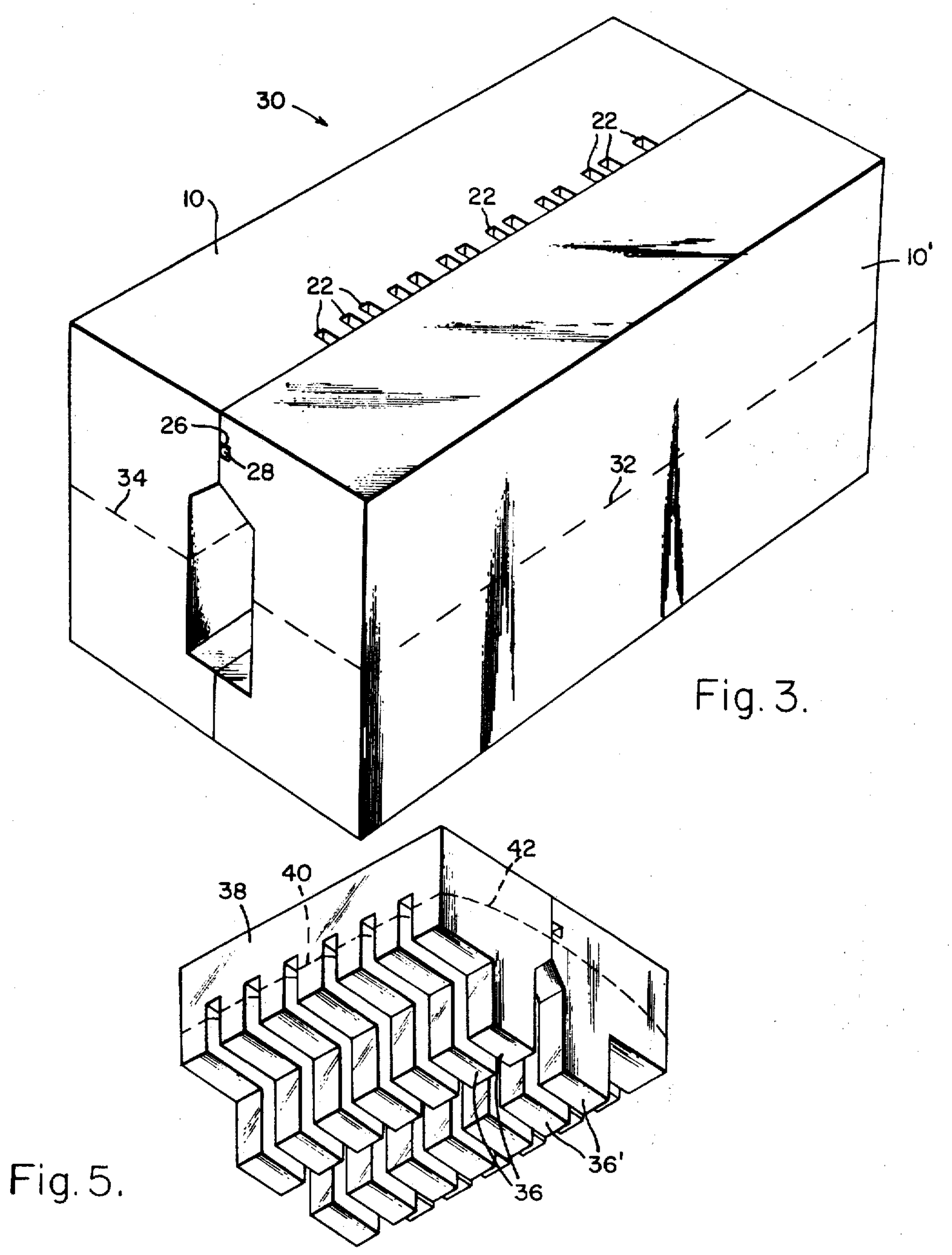
FIG. 3 is a perspective view of the ferrite members shown in FIG. 1 as assembled.
FIG. 5 is a perspective view of the upper portion of the assembly shown in FIG. 2 which has been shaped to demonstrate a possible pole configuration for a multitrack magnetic head.

The assembly 30 is shown in FIG. 3, and is permitted to cool whereupon the two ferrite parts 10, 10' are bonded to one another by the glass therebetween.

It should be noted that during the glass softening step, it is not required that the sputtered layers completely melt so long as these layers soften to an extent for providing a sufficiently decreased resistance to capillary flow. It is therefore not necessary that the sputtered glass and the glass rod 28 have the same composition.

Further, the glass rod 28 (or both the glass rod and the sputtered glass) can be of a type of glass which contains nucleating agents, such as sold by Corning Glass Works under the registered trademark "Pyroceram" and in particular Pyroceram Brand Cements. In such case, after the quantity of glass containing such nucleating agents has been drawn into the gap, the rate of cooling is adjusted to permit devitrification of the glass and development of a crystalline structure.

Figure 4:
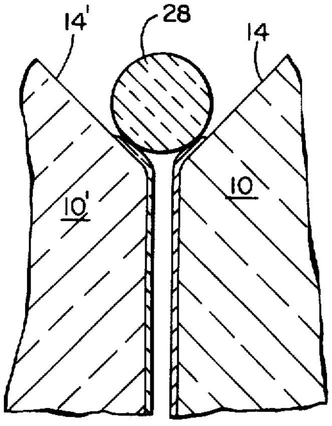
FIG. 4 is a fragmentary cross-sectional view of assembled ferrite members similar to those shown in FIG. 1, taken along a line corresponding to the line 2—2 in FIG. 1, showing an alternative manner of positioning the glass rod prior to heating, the relative dimensions of the component parts of FIG. 1 shown exaggerated for the purpose of clarity of description.

In an alternative manner of practicing the present invention, represented in FIG. 4, the ferrite assembly is inverted and the glass rod 26 is positioned in the apex of the channel portions 14, 14'. As shown in FIG. 4, the glass rod is positioned in contact with the layers of sputtered glass extending from and continuous with the sputtered glass layers within the gap and onto the channel portions 14, 14'.

After cooling, the assembly 30 is shaped to provide a multiple structure for a multitrack magnetic head, whereupon the glass-bonded surfaces are to become pole tip pairs. Turning to FIGS. 3 and 5, the assembly 30 is cut along lines 32, 34, dividing the assembly into two parts. The upper part can be shaped, for example, as shown in FIG. 5; ferrite material can be removed from the assembly 30, and legs 36, 36' can be defined. The resulting structure, as shown in FIG. 5, comprises a series of magnetic poles bonded together at their pole tips and maintained as an integral assembly by the plurality of glass-bonded surfaces.

After each leg pair 36, 36' is magnetically closed (e.g., by placing it across respective yokes or magnetic closing pieces, not shown), the magnetic poles are magnetically shielded from one another by interposing suitable shield and spacing members (not shown), and the unit is encapsulated with a suitable encapsulant such as an epoxy. The uncut glass bonded ferrite portion 38 is thereupon removed (e.g., by grinding) along line 40 and curve 42 to reveal the glass-bonded pole tip structures, separated from one another by predetermined distances. In this example, all of the refractory material previously deposited is therefore removed. The ground surface comprises the running surface of a complete multitrack magnetic head.

If desired, the refractory material can be applied to the surfaces 24' of the second ferrite member 10', in addition to the surfaces 24 of the first ferrite member 10, in which case the combined thickness of both refractory layers will be equal to the desired gap length.

Thus, there has been shown an improved method of making ferrite magnetic heads, and in particular multitrack magnetic recording/playback heads. Modifications in the method of the present invention, and variations in the preferred and alternative manner of practicing the invention herein presented, may be developed without departing from the essential characteristics thereof. Accordingly, the invention should be limited only by the scope of the claims listed below.

What is claimed is:

1. In a method for manufacturing a magnetic head having at least one pole tip pair, the tips of each pair separated by a nonmagnetic gap of a desired length, the steps comprising:

1. preparing a first ferrite member to have at least three spaced, coplanar first surfaces;
2. preparing a second ferrite member to have at least three spaced, coplanar second surfaces corresponding to said first surfaces for confronting relation therewith;
3. sputtering a first layer of glass on one of said first surfaces, said one positioned between two others of said first surfaces;
4. sputtering a second layer of glass on one of said second surfaces corresponding to said one of said first surfaces for confronting relation therewith, the combined thickness of said first and second layers of glass being less than the desired gap length;
5. applying a layer of refractory material on said two others of said first surfaces, said refractory layer having a thickness equal to the desired gap length;
6. placing said first and second ferrite members with corresponding ones of said first and second surfaces in confronting relation and said refractory layer in contact engagement with confronting ones of said second surfaces, for defining the gap;
7. placing a quantity of glass adjacent to and contacting one or both of said first and second layers of glass, for being adjacent the gap;
8. heating said ferrite members to soften said layers of glass and said quantity of glass while said refractory layer is maintained in contact engagement with confronting ones of said second surfaces, at least a portion of the softened quantity of glass flowing into the gap for bonding the two members together.

2. The method according to claim 1, wherein the glass of said first layer extends from said one of said first surfaces and, in step (7), said quantity of glass is placed in contact with the glass extending from said one of said first surfaces.

3. The method according to claim 1, wherein the glass of said second layer extends from said one of said second surfaces and, in step (7), said quantity of glass is placed in contact with the glass extending from said one of said second surfaces.

4. The method according to claim 1, wherein the glass of said first and second layers extend from said ones of said first and second surfaces respectively and, in step (7), said quantity of glass is placed in contact with the glass extending from said ones of said first and second surfaces.

5. The method according to claim 1, wherein the desired gap length is less than 40 microinches.

6. The method according to claim 1, wherein said quantity of glass is of a type containing nucleating agents and, after the heating step, said ferrite members are cooled at a rate adjusted to cause devitrification of said glass.

7. The method according to claim 6, wherein said first and second layers of glass are of a type containing nucleating agents.

8. In a method for manufacturing a magnetic head having at least one pole tip pair, the tips of each pair separated by a nonmagnetic gap of a desired length, the steps comprising:

1. preparing a first ferrite member to have a plurality of spaced, coplanar first surfaces;
2. preparing a second ferrite member to have a plurality of spaced, coplanar second surfaces corresponding to said first surfaces for confronting relation therewith;
3. sputtering a first layer of glass on alternate ones of said first surfaces;
4. sputtering a second layer of glass on alternate ones of said second surfaces corresponding to said alternate ones of said first surfaces for confronting relation therewith, the combined thickness of said first and second layers of glass being less than the desired gap length;
5. applying a layer of refractory material on other ones of said first surfaces, said refractory layer having a thickness equal to the desired gap length;
6. placing said first and second ferrite members with corresponding ones of said first and second surfaces in confronting relation and said refractory layer in contact engagement with confronting ones of said second surfaces, for defining the gap;
7. placing a quantity of glass adjacent to and contacting one or both of said first and second layers of glass, for being adjacent the gap;
8. heating said ferrite members to soften said layers of glass and said quantity of glass while said refractory layer is maintained in contact engagement with confronting ones of said second surfaces, at least a portion of the softened quantity of glass flowing into the gap for bonding the two members together.

9. The method according to claim 8, wherein the glass of said first layer extends from said first surfaces and, in step (7), said quantity of glass is placed in contact with the glass extending from said first surfaces.

10. The method according to claim 8, wherein the glass of said second layer extends from said second surfaces and, in step (7), said quantity of glass is placed in contact with the glass extending from said second surfaces.

11. The method according to claim 8, wherein the glass of said first and second layers extend from said first and second surfaces respectively and, in step (7), said quantity of glass is placed in contact with the glass extending from said first and second surfaces.

12. The method according to claim 8, wherein the desired gap length is less than 40 microinches.

13. The method according to claim 8, wherein said quantity of glass is of a type containing nucleating agents and, after the heating step, said ferrite members are cooled at a rate adjusted to cause devitrification of said glass.

14. The method according to claim 13, wherein said first and second layers of glass are of a type containing nucleating agents.

15. In a method for manufacturing a magnetic head having at least one pole tip pair, the tips of each pair separated by a nonmagnetic gap of a desired length, the steps comprising:

1. preparing a first ferrite member to have at least three spaced, coplanar first surfaces;
2. preparing a second ferrite member to have at least three spaced, coplanar second surfaces corresponding to said first surfaces for confronting relation therewith;
3. sputtering a first layer of glass on one of said first surfaces, said one positioned between two others of said first surfaces;
4. sputtering a second layer of glass on one of said second surfaces corresponding to said one of said first surfaces for confronting relation therewith, the combined thickness of said first and second layers of glass being less than the desired gap length;
5. applying a first layer of refractory material on said two others of said first surfaces;
6. applying a second layer of refractory material on said two others of said second surfaces, said first and second refractory layers having a combined thickness equal to the desired gap length;
7. placing said first and second ferrite members with corresponding ones of said first and second surfaces in confronting relation and confronting ones of said refractory layers in contact engagement, for defining the gap;
8. placing a quantity of glass adjacent to and contacting one or both of said first and second layers of glass, for being adjacent the gap; and
9. heating said ferrite members to soften said layers of glass and said quantity of glass while said refractory layers are maintained in contact engagement, at least a portion of the softened quantity of glass flowing into the gap for bonding the two members together.

16. In a method for manufacturing a magnetic head having at least one pole tip pair, the tips of each pair separated by a nonmagnetic gap of a desired length, the steps comprising:

1. preparing a first ferrite member to have a plurality of spaced, coplanar first surfaces;
2. preparing a second ferrite member to have a plurality of spaced, coplanar second surfaces corresponding to said first surfaces for confronting relation therewith;
3. sputtering a first layer of glass on alternate ones of said first surfaces;
4. sputtering a second layer of glass on alternate ones of said second surfaces corresponding to said alternate ones of said first surfaces for confronting relation therewith, the combined thickness of said first and second layers of glass being less than the desired gap length;
5. applying a first layer of refractory material on other ones of said surfaces;
6. applying a second layer of refractory material on other ones of said second surfaces, said first and second refractory layers having a combined thickness equal to the desired gap length;

7. placing said first and second ferrite members with corresponding ones of said first and second surfaces in confronting relation and confronting ones of said refractory layers in contact engagement, for defining the gap;
8. placing a quantity of glass adjacent to and contacting one or both of said first and second layers of glass, for being adjacent the gap; and
9. heating said ferrite members to soften said layers of glass and said quantity of glass while said refractory layers are maintained in contact engagement, at least a portion of the softened quantity of glass flowing into the gap for bonding the two members together.

17. In a method for manufacturing a magnetic head having at least one pole tip pair, the tips of each pair separated by a nonmagnetic gap of a desired length, the steps comprising:

1. preparing a first ferrite member to have a planar first surface;
2. preparing a second ferrite member to have a planar second furface;
3. sputtering a first layer of glass on said first surface;
4. sputtering a second layer of glass on said second surface, the combined thickness of said first and second layers of glass being less than the desired gap length;
5. placing said first and second ferrite members with said first and second surfaces in confronting relation with the gap defined therebetween;
6. placing a quantity of glass adjacent to and contacting one or both of said first and second layers of glass, for being adjacent the gap;
7. heating said ferrite members to soften said layers of glass and said quantity of glass while first and second surfaces are maintained in confronting relation with said gap defined therebetween, at least a portion of the softened quantity of glass flowing into the gap for bonding the two members together.

18. The method according to claim 17, wherein the glass of said first layer extends from said first surface and, in step (6), said quantity of glass is placed in contact with the glass extending from said first surface.

19. The method according to claim 17, wherein the glass of said second layer extends from said second surface and, in step (6), said quantity of glass is placed in contact with the glass extending from said second surface.

20. The method according to claim 17, wherein the glass of said first and second layers extend from said first and second surfaces respectively and, in step (6), said quantity of glass is placed in contact with the glass extending from said first and second surfaces.

21. The method according to claim 17, wherein the desired gap length is less than 40 microinches.

22. The method according to claim 17, wherein said quantity of glass is of a type containing nucleating agents and, after the heating step, said ferrite members are cooled at a rate adjusted to cause devitrification of said glass.

23. The method according to claim 22, wherein said first and second layers of glass are of a type containing nucleating agents.

* * * * *

PO-1050
(5/69)

UNITED STATES PATENT OFFICE
CERTIFICATE OF CORRECTION

Patent No. 3,824,685 Dated July 23, 1974

Inventor(s) Nathan L. Burch and Leonard G. Tapia

It is certified that error appears in the above-identified patent and that said Letters Patent are hereby corrected as shown below:

Column 4, line 45, the word "within" should read "width".

Signed and sealed this 22nd day of October 1974.

(SEAL)
Attest:

McCOY M. GIBSON JR.
Attesting Officer

C. MARSHALL DANN
Commissioner of Patents